(12) United States Patent
McCloskey et al.

(10) Patent No.: US 11,250,876 B1
(45) Date of Patent: Feb. 15, 2022

(54) METHOD AND SYSTEM FOR CONFIDENTIAL SENTIMENT ANALYSIS

(71) Applicant: STATE FARM MUTUAL AUTOMOBILE INSURANCE COMPANY, Bloomington, IL (US)

(72) Inventors: Connor Warren McCloskey, Bloomington, IL (US); Divya Pratap Singh Bhati, Arlington Heights, IL (US); Donna Gerig, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 120 days.

(21) Appl. No.: 16/707,345

(22) Filed: Dec. 9, 2019

(51) Int. Cl.
| | | |
|---|---|---|
| *G10L 21/00* | (2013.01) | |
| *G10L 25/00* | (2013.01) | |
| *G10L 25/63* | (2013.01) | |
| *H04M 3/51* | (2006.01) | |
| *G06N 20/00* | (2019.01) | |
| *G10L 15/26* | (2006.01) | |
| *G06Q 40/08* | (2012.01) | |

(52) U.S. Cl.
CPC .............. *G10L 25/63* (2013.01); *G06N 20/00* (2019.01); *G10L 15/26* (2013.01); *H04M 3/5183* (2013.01); *G06Q 40/08* (2013.01)

(58) Field of Classification Search
CPC ......... G10L 15/26; G10L 25/63; G06N 20/00; G06Q 40/08; H04M 3/5183
USPC .......................................................... 704/270
See application file for complete search history.

(56) References Cited

U.S. PATENT DOCUMENTS

| | | | | |
|---|---|---|---|---|
| 8,477,915 | B1 * | 7/2013 | Vasquez ............ | H04M 3/42221 379/88.23 |
| 8,644,457 | B1 * | 2/2014 | Vasquez ............ | H04M 3/42221 379/88.01 |
| 9,437,207 | B2 * | 9/2016 | Jacob ...................... | G10L 15/02 |
| 9,875,647 | B1 * | 1/2018 | Tannenbaum ........... | G07C 9/28 |
| 10,388,272 | B1 * | 8/2019 | Thomson .............. | G10L 15/063 |
| 10,554,817 | B1 * | 2/2020 | Sullivan ................... | G06N 5/02 |

(Continued)

*Primary Examiner* — Khai N. Nguyen
(74) *Attorney, Agent, or Firm* — Marshall, Gerstein & Borun LLP

(57) ABSTRACT

A confidential sentiment analysis method includes receiving call data, storing the call data including interaction metadata, generating a speech-to-text transcript corresponding to words spoken by one or more callers, generating an anonymized transcript by anonymizing personally identifiable words, and generating a sentiment score by analyzing the anonymized transcript. A computing system includes a processor, and a memory including computer executable instructions that, when executed by the one processor, cause the system to receive call data, store the call data, generate a speech-to-text transcript, generate an anonymized transcript by anonymizing personally identifiable words, and generate a sentiment score based on the anonymized transcript. A non-transitory computer readable medium contains program instructions that when executed, cause a computer system to receive call data, store the call data, generate a speech-to-text transcript, generate an anonymized transcript by anonymizing personally identifiable words, and generate a sentiment score based on the anonymized transcript.

20 Claims, 6 Drawing Sheets

(56) References Cited

U.S. PATENT DOCUMENTS

| | | | | |
|---|---|---|---|---|
| 10,573,312 | B1* | 2/2020 | Thomson | G10L 15/26 |
| 10,672,383 | B1* | 6/2020 | Thomson | G10L 15/183 |
| 10,748,644 | B2* | 8/2020 | Shriberg | G16H 15/00 |
| 11,017,778 | B1* | 5/2021 | Thomson | G10L 15/32 |
| 2004/0006586 | A1* | 1/2004 | Melchione | G06F 21/56 |
| | | | | 709/201 |
| 2004/0267820 | A1* | 12/2004 | Boss | H04L 67/2842 |
| 2009/0028132 | A1* | 1/2009 | Portman | H04M 3/42323 |
| | | | | 370/352 |
| 2012/0288077 | A1* | 11/2012 | Perna | H04M 15/09 |
| | | | | 379/114.21 |
| 2014/0278366 | A1* | 9/2014 | Jacob | G10L 15/26 |
| | | | | 704/9 |
| 2015/0195406 | A1* | 7/2015 | Dwyer | G10L 15/26 |
| | | | | 379/265.07 |
| 2015/0294079 | A1* | 10/2015 | Bergougnan | G16H 20/10 |
| | | | | 705/2 |
| 2019/0037077 | A1* | 1/2019 | Konig | H04M 3/5183 |
| 2019/0347668 | A1* | 11/2019 | Williams | H04L 67/2833 |
| 2019/0385711 | A1* | 12/2019 | Shriberg | G10L 25/66 |
| 2020/0118458 | A1* | 4/2020 | Shriberg | G16H 40/67 |
| 2020/0159826 | A1* | 5/2020 | Lev Tov | G06F 40/30 |
| 2020/0160351 | A1* | 5/2020 | Veggalam | H04M 3/5233 |
| 2020/0175961 | A1* | 6/2020 | Thomson | G10L 15/063 |
| 2020/0175962 | A1* | 6/2020 | Thomson | G10L 15/183 |
| 2020/0327191 | A1* | 10/2020 | Lev-Tov | G06F 17/18 |
| 2021/0034963 | A1* | 2/2021 | Chu | G06F 16/285 |
| 2021/0034964 | A1* | 2/2021 | Chu | G06N 3/08 |

* cited by examiner

| Time | Speaker | Text |
|---|---|---|
| 19:00:01.050 | [Agent] | Thank you for calling State Farm, this is [Agent]. How can I help you today? ~302 |
| 19:00:02.062 | [Customer1] | We need to file a claim. |
| 19:00:03.120 | [Agent] | Sure. Please let me get some information from you first. Can you tell me your mother's maiden name? |
| 19:00:04.762 | [Customer1] | [XXXXXX]. ~304 |
| 19:00:06.420 | [Agent] | Thanks. And your address on file? |
| 19:00:07.762 | [Customer1] | [Address]. ~306 |
| 19:00:09.934 | [Agent] | Great. And why are you calling today? |
| 19:00:11.201 | [Customer1] | We were in an accident. My wife was driving our car to [Location] and we were rear ended by someone driving a [VehicleMakeModel]. ~308 ~310 |
| 19:00:13.765 | [Agent] | I'm sorry to hear that. Was anyone injured? |
| 19:00:14.223 | [Agent] | Yes, my [Relation] [PersonName] [DescriptionOfInjury]. ~312 ~314 ~316 |

300

FIG. 3 ary to methods and systems for transforming speech to text, anonymizing the text, and determining caller and/or operator emotion to improve call quality and outcomes.

METHOD AND SYSTEM FOR CONFIDENTIAL SENTIMENT ANALYSIS

FIELD OF THE DISCLOSURE

The present disclosure generally relates to a confidential sentiment analysis system and method, and more particularly to methods and systems for transforming speech to text, anonymizing the text, and determining caller and/or operator emotion to improve call quality and outcomes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Structured and unstructured customer data is sensitive, including personally identifiable information, the unauthorized disclosure of which can expose an organization to unwelcome public scrutiny (e.g., fines, legal liability, negative press, etc.). In some cases, such disclosure is a violation of state and/or federal law (e.g., the Health Insurance Portability and Accountability Act (HIPAA)) and can have devastating consequences. In other cases, Payment Card Industry Data Security Standard (PCI DSS) and the European Union General Data Protection Regulation (GDPR) impose additional requirements, dictating that data be handled according to a particular set of standards. The GDPR sets forth fines of $10 million, or 2% of global turnover for violations of its provisions. In July of 2019, the United Kingdom's Information Commissioner's Office imposed data breach fines under the GDPR of $230 million USD and $124 million USD to an airline and an hotelier, respectively.

De-identification, also known as data anonymization, is a process whereby personally identifying information is removed from a data set, to mask or delete information regarding human individuals, businesses, and/or other entities. Redaction, also known as sanitization, is a process wherein sensitive information is removed, replaced with other information, and/or encrypted. Both de-identification and redaction allow for selective editing of text, and result in a document that may be suitable for purposes that the original document is not (e.g., analysis in an academic study, dissemination to a wider audience, use without violating applicable privacy laws, etc.).

Existing de-identification and redaction tools suffer from several drawbacks. First, these tools require users to upload their unredacted and non-de-identified information to a computing environment that is owned/controlled by a third party, which may in and of itself constitute a breach of fiduciary duty, and/or a violation of law. For example, several software companies operate services that purport to perform redaction and de-identification. However, a company is required to upload unredacted and non-de-identified sensitive customer data to the third party service in order to receive a redacted and/or de-identified copy of the data in return. A window, however small, exists for the sensitive data to be intercepted and exploited by a malicious hacker.

Second, an organization may need to process large volumes of data (e.g., terabytes or more), and transferring such amounts of data to a third party service over a computer network is wasteful, computationally infeasible, and/or prohibitively expensive. Costs are increased due to the third party service charging per-call application programming interface (API) fees. For example, third-party APIs may impose rate limiting that prevents clients from timely processing the large volumes of data.

Third, organizational data is often proprietary in nature and does not fit the one-size-fits-all data schemas provided by commercial de-identification and redaction tools, that are designed and built to accommodate general purpose data. For example, de-identification and redaction APIs often include tools for anonymizing (i.e., de-identifying and/or redacting) common information, such as telephone numbers, social security numbers, etc. but do not include any facility for anonymizing domain-specific corpora, such as insurance policy numbers, medical procedure information, accident descriptions, just to name a few.

Fourth, existing anonymization tools do not consistently handle messy (e.g., non-uniform) unstructured data. For example, an online tool (e.g., Scrubadub.IO) correctly redacts a telephone number in the format "NNN-NNN-NNNN" but does not redact the same telephone number formatted as "(NNN)NNN-NNNN." The same online tool is not able to recognize telephone numbers that include alpha-numeric doppelgangers, such as the number "0" and the letter "o," and is similarly incapable of detecting or anonymizing telephone numbers that include alphabetic numerals (e.g., "one eight hundred one two three four five six seven", "9 oh 9", etc.).

Many organizational units desire to use customer data to improve the products and services provided to customers. However, due to the foregoing limitations, such organizational units are prohibited from fully leveraging the customer data. There is therefore a recognized need for methods and systems that anonymize (i.e., de-identify and/or redact) information without relying on transferring data to a third-party API, that are efficient, that allow domain-specific information to be handled, and that handle unstructured and/or non-uniform data.

BRIEF SUMMARY

In one aspect, a computer implemented method for confidential sentiment analysis, includes receiving call data in an interaction recording system of a call center recorder, wherein the interaction recording system is located behind a firewall of an internal network sub-environment, storing the call data in an electronic database, wherein the call data includes interaction metadata, generating a speech-to-text transcript by analyzing call audio in the call data, wherein the speech-to-text transcript corresponds to words spoken by one or more callers during the call, generating an anonymized transcript corresponding to the speech-to-text transcript by identifying, removing, replacing, or obscuring one or more alpha-numeric personally identifiable words, and generating a sentiment score by analyzing the anonymized transcript using a sentiment analysis service.

In another aspect, a confidential sentiment analysis computing system includes one or more processors, and a memory including computer executable instructions that, when executed by the one or more processors, cause the computing system to receive call data in an interaction recording system of a call center recorder, wherein the interaction recording system is located behind a firewall of an internal network sub-environment, store the call data in an electronic database, wherein the call data includes interaction metadata, generate a speech-to-text transcript by analyzing call audio in the call data, wherein the speech-totext transcript corresponds to words spoken by one or more callers during the call, generate an anonymized transcript corresponding to the speech-to-text transcript by identifying, removing, replacing, or obscuring one or more alpha-numeric personally identifiable words, and generate a sentiment score by analyzing the anonymized transcript using a sentiment analysis service.

In yet another aspect, a non-transitory computer readable medium containing program instructions that when executed, cause a computer system to receive call data in an interaction recording system of a call center recorder, wherein the interaction recording system is located behind a firewall of an internal network sub-environment, store the call data in an electronic database, wherein the call data includes interaction metadata, generate a speech-to-text transcript by analyzing call audio in the call data, wherein the speech-to-text transcript corresponds to words spoken by one or more callers during the call, generate an anonymized transcript corresponding to the speech-to-text transcript by identifying, removing, replacing, or obscuring one or more alpha-numeric personally identifiable words, and generate a sentiment score by analyzing the anonymized transcript using a sentiment analysis service.

BRIEF DESCRIPTION OF THE DRAWINGS

FIG. 3 depicts an example transcript, according to an embodiment.

DETAILED DESCRIPTION

Overview

The present techniques include methods and systems for confidential sentiment analysis, and more particularly, methods and systems for transforming speech to text and anonymizing the text. In an embodiment, sentiment analysis is performed using the text to determine caller and/or operator emotion, and to improve call quality and outcomes. By using audio interactions from customers and/or employees, the present techniques allow the company (e.g., an insurer) to gain insights into feedback and sentiment, to better enable an enhanced, personalized experience for customers, while maintaining essential guarantees surrounding the issues of personal privacy, confidentiality and compliance with laws governing such issues. The present techniques disclose a pipeline that may include a speech-to-text transcription module, an anonymization (e.g., redaction, de-identification, etc.) module, and/or a sentiment analysis module. Together, the pipeline modules supply the company with an integrated solution for processing of text data in a way that keeps control of all data in-house, processes large volumes of data efficiently, accommodates domain-specific information, and handles non-uniformity in the data, delivering on the promise customer experience excellence.

Example Computing Environment

Figure 1:
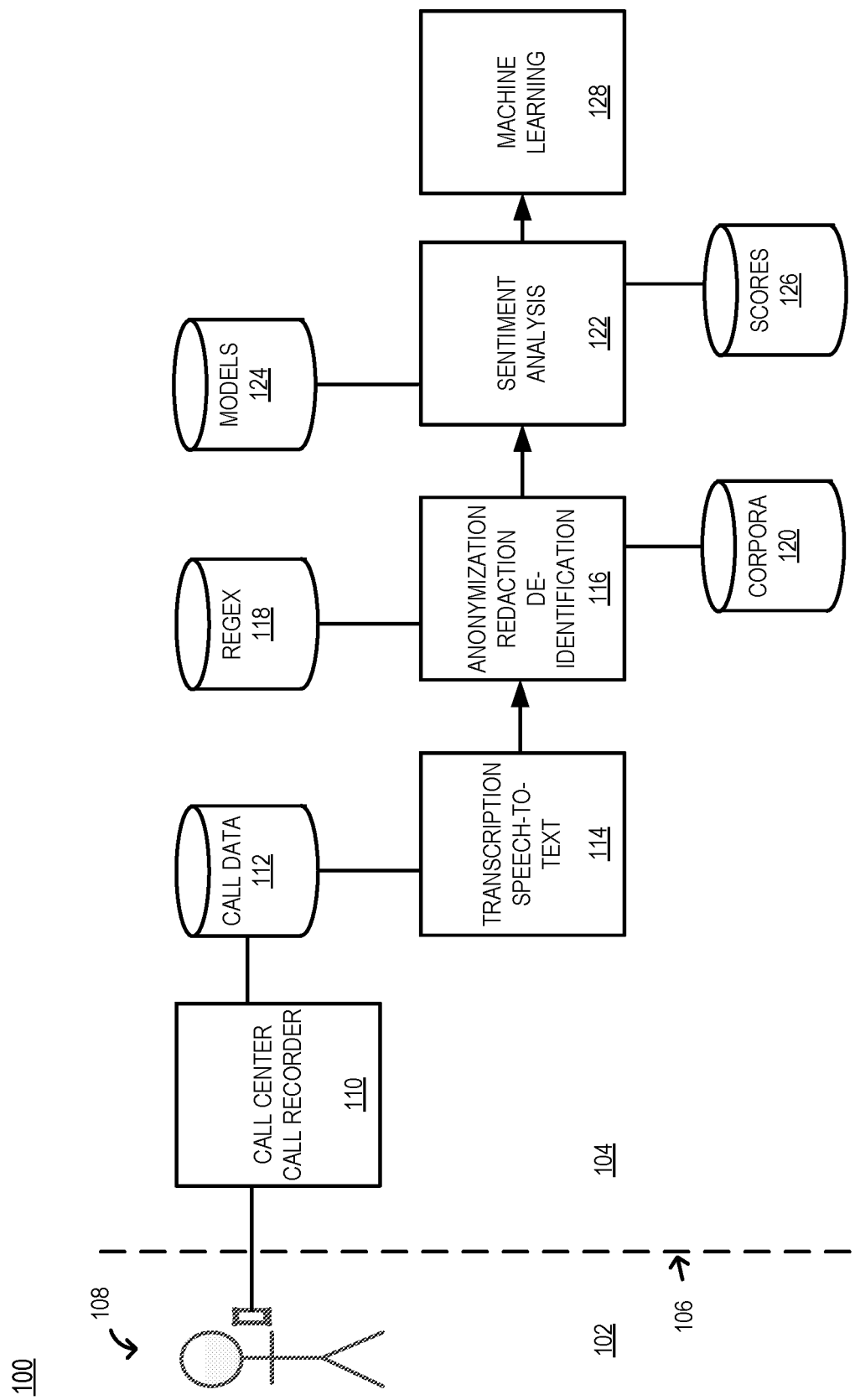
FIG. 1 depicts an example environment for implementing a confidential voice and text anonymization service, including confidential sentiment analysis embodiments.

FIG. 1 depicts an example environment 100 for implementing a confidential voice and text anonymization service, including confidential sentiment analysis embodiments. The environment 100 includes an external sub-environment 102 and an internal sub-environment 104, divided by a firewall 106. The external sub-environment 102 may correspond to, for example, an environment that is outside of a corporate network (e.g., the Internet, a privately-owned telecommunications network, etc.). The internal sub-environment 104 corresponds to the network of the company. However, in an embodiment, the external sub-environment 102 may be a network of the company, such as when the environment 100 is used for intra-company calling, and/or for testing purposes. The firewall 106 may be a corporate firewall comprising one or more software and/or hardware firewalls. The firewall 106 is depicted as a single line for explanatory purposes, but in practice, may comprise multiple logical layers of separation.

The environment 100 further includes a customer 108 in communication with a call center call recorder 110, that is communicatively coupled to a call data database 112; a transcription and speech-to-text service 114 that is communicatively coupled to the call data database 112; an anonymization, redaction, and de-identification service 116 that is coupled to a regex database 118 and a corpora database 120; and a sentiment analysis service 122 that is coupled to a models database 124 and a scores database 126. In some embodiments, a machine learning service 128 may be coupled to the sentiment analysis service 122.

The customer 108 may be a customer of the company, such as a policy holder. The customer 108 may place a call to the company using a mobile telephone, land line, voice over IP (VoIP) telephone, etc. The call of the customer 108 may be automatically answered by the call center call recorder 110.

The call center call recorder 110 may be an interaction recording system (e.g., a private branch exchange (PBX) system) that includes computer executable instructions for receiving, placing, and processing telephone calls, and for creating interaction records. For example, the call center call recorder 110 may include instructions for automatically answering a telephone call, and transmitting a voice prompt to the user, wherein the voice prompt is a phone tree menu. The user may press a number key on the user's dial pad, or speak a command, to navigate the phone tree menu. The call center call recorder may collect consent from the user to record and/or monitor the user's telephone call. The call center call recorder 110 may create an interaction in the call data database 112. In some embodiments, the call center call recorder 110 may be implemented wholly and/or partially using a third-party commercial off-the-shelf (COTS) software package (e.g., Verint Intelligent Recording).

The call data database 112 stores interactions. Interactions are defined as records that correspond to a customer telephone call, and include metadata and call data. For example, an interaction record may include, without limitation, a call initiation time stamp (e.g., the time the call center call recorder 110 received the call), caller identification information (e.g., a telephone number of the customer 108 (the caller)), a call duration, answerer identification (e.g., the name and/or extension of an employee of the company who received the call), call quality metrics, an indication of whether the user provided keypad-based and/or oral consent to call recording, and an audio recording of some or all of the telephone call between the customer 108 and the call receiver (e.g., the company employee who handled the call).

The call audio may be stored as a file encoded in any suitable audio format, including MP3, FLAC, WAV, etc. In some cases, the call audio files are stored as flat files on a file system and are referenced by a file path stored in the call data database 112.

The transcription and speech-to-text service 114 analyzes the call audio stored in the call center call recorder 110 and generates a transcript for each call, wherein the transcript corresponds to the words spoken during the call. The transcription and speech-to-text service 114 includes computer executable instructions for speaker identification. The transcript is a textual representation of the call in chronological order, and may include timestamps and speaker indicators for one or more speakers, respective to each spoken word and/or phrase. For example, in a call between the customer 108 and a customer service representative, the transcript may include entries such as:

08:30:14 [Jane N.] Hello, and thank you for calling State Farm Insurance company. My name is Jane. How many I help you today?

08:30:15 [John M.] I'm calling to request assistance with my car insurance accounts.

The above example is simplified for discussion purposes. In practice, transcripts may include many (e.g., thousands of entries) between one or more parties. For example, the customer 108 may call with another person on the line (e.g., a spouse), who may also speak to the customer service representative. In such a case, the transcript includes entries corresponding to three distinct speakers. In some embodiments, the transcription and speech-to-text service 112 is implemented using a third-party speech-to-text API/service. In some embodiments, the transcription and speech-to-text service 114 may be provided by the call center call recorder 110. The transcription and speech-to-text service 114 may store the transcript in a transcripts database (not depicted) and/or forward the transcript to the anonymization, redaction and de-identification service 116. An example transcript is depicted in FIG. 3, below.

The anonymization, redaction and de-identification service 116 processes textual data to anonymize, redact, and/or de-identify the text data. The anonymization, redaction and de-identification service 116 includes computer executable instructions for de-identification and redaction. The computer executable instructions include regular expressions (regexes) that identify, remove, obscuring, and/or replace alpha-numeric information based on patterns known to correspond to conventional personally identifiable information, including, for example, telephone numbers, postal addresses, social security numbers, bank accounts, credit card numbers, etc. as well as domain-specific personally identifiable information (PII), such as insurance policy numbers, medical/surgical descriptions, medical diagnostic information, first responder information, location information, employee information, etc. Each type of domain-specific PII may be associated with a set of regular expressions in the regex database 118 and/or a set of words in the corpora database 120.

Specifically, the regex database 118 may include a category name (e.g., "surgical") and a list of regular expressions that relate to the category. Each regular expression may include one or more type, such as replacement, multi-line, deletion, first only, global match, etc. regarding the behavior of the regular expression when evaluated. The regular expressions stored in the database 118 may be curated by one or more users, and/or created programmatically. The regex database 118 also includes repair regular expressions for detecting and repairing imperfect transcriptions. For example, the repair regular expressions include regular expressions for detecting and converting alphanumeric doppelgangers, as described above, and for detecting and repairing alphabetic numerals (e.g., converting "eight" to its numeric equivalent).

The corpora database 120 may include a category name (e.g., "cancer") and a corpus of terms that relate to the category. The corpora database may specify wildcards (e.g., "cancer") that match all endings (e.g., "cancerous", "cancer-inducing," etc.) of a word, as well as a case-sensitivity flag for each word, governing how the word will be matched to the textual data. The anonymization, redaction and de-identification service 116 maybe implemented as a set of computer-executable instructions stored in the memory of a computer, as discussed below. The anonymization, redaction and de-identification service 116 includes instructions for creating, retrieving, updating, and deleting regular expressions from the regex database 118; and for creating, retrieving, updating, and deleting corpora from the corpora database 120.

The anonymization, redaction and de-identification service 116 includes instructions for evaluating the regular expressions stored in the regex database 118, according to the type information affecting behavior. For example, the anonymization, redaction and de-identification service 116 may execute a regular expression against the textual data as a multi-line expression based on type information retrieved along with the regular expression. The anonymization, redaction and de-identification service 116 includes instructions for executing a text replacement command using a corpus of words, wherein each of the words in the corpus of words is evaluated in the context of the textual data.

In some embodiments, the anonymization, redaction and de-identification service 116 edits the textual data in place. That is, any removal/replacement of text from the textual data is removed from a single copy in the memory of a computing device. In some embodiments, the anonymization, redaction and de-identification service 116 generates a modified copy of the textual data. The textual data may be represented in any suitable format, such as a file, a byte stream, etc. In some embodiments, the anonymization, redaction and de-identification service 116 compiles regular expressions. Thus, the present techniques improve the functioning of a computer by avoiding compiling the regular expression at each evaluation of the textual data, because the regular expression need only be evaluated once, when the anonymization, redaction and de-identification service 116 begins executing. In some embodiments, the anonymization, redaction and de-identification service 116 includes multiple localized corpora relating to a single concept. For example, a "names" corpora may have an English version as well as a South Asian version. A different corpora may be selected at runtime based on the location of the customer/caller 108.

The anonymization, redaction and de-identification service 116 may operate in one of several modes. In a redaction mode, the anonymization, redaction and de-identification service 116 overwrites matching regular expression patterns and corpora words with a pre-determined character, on a character-by-character basis. Therefore, a sentence such as "This is Jane Doe, my social security number is 123-45-6789" would be modified by the anonymization, redaction and de-identification service 116 to, "My name is XXXX XXX, my social security number is XXX-XX-XXXX." In some embodiments, the anonymization, redaction and de-identification service 116 may replace with a word on a word-by-word basis, resulting in "My name is NULL NULL, my social security number is NULL," wherein the words correspond to a regular expression pattern matching first name, last name, and social security number. In another mode, the anonymization, redaction and de-identification service 116 operates in a replace similar mode, wherein the anonymization, redaction and de-identification service 116 service retrieves a random word for each word replaced, wherein the random word is generated using a similarity metric. Continuing the above example, the modified sentence reads, ""My name is Jim Jones, my social security number is 567-568-8987." In such an embodiment, the sentence includes a fictional name and a fictional social security number and as such is de-identified, but not redacted. In yet another embodiment, the anonymization, redaction and de-identification service 116 operates in a mode that redacts on a word-by-word basis and replaces each word with a descriptor, such that in the above example, the processed sentence reads, "This is [[First Name]] [[Last Name]], my social security number is [[Social Security Number]]." The latter mode is useful for a human reading the redacted text, in that the context of the removed text is provided. By using a unique delimiter around the replaced words, such as double brackets, a subsequent processing service (not depicted) can easily apply styling (e.g., bolding, highlighting, hyperlinking, etc.) to the modified text, to allow a reader to quickly home in on modified/redacted information. Herein, a "word" may include one or more character. A "word" may also refer to a regular expression match or pattern. An administrator user of the anonymization, redaction and de-identification service 116 may specify which of the modes to use on a global level, on a page-by-page level, on a corpora-by-corpora level, on a word-by-word level, and/or on a regex-by-regex level. The administrator user may also specify a default mode, and selectively set modes for one or more of the regular expressions.

The anonymization, redaction and de-identification service 116 may store modified textual data (whether in the original or a generated copy) in a modified transcripts database (not depicted) and/or may provide the modified textual data directly to another service/module (e.g., via inter-process communication) such as the sentiment analysis service 122.

The sentiment analysis service 122 includes computer-executable instructions for analyzing transcripts generated by the transcription and speech-to-text service 114 to determine a time series of sentiment scores. The sentiment analysis module 122 may analyze transcripts that are generated by the transcription and speech-to-text service 114 with no further processing, as well as those generated/modified by the anonymization, redaction and de-identification service 116. The sentiment analysis module 122 uses one or more models from the models database 124 to perform its analysis, and may also call on models in the machine learning service 128. The models in the machine learning service 128 may include machine learning (ML) models that are created in-house, and/or third party models (e.g., VADER, a rule-based model for general sentiment analysis, support vector machines (SVMs), bag-of-words, bigrams, etc.).

The sentiment analysis module 122 generates a time series wherein each time step corresponds to a transcript time, and each is associated with a respective sentiment score. The composite score may be an N-tuple, (e.g., a 3-tuple wherein the values correspond, respectively, to negative sentiment, neutral sentiment, and positive sentiment, and the values of the 3-tuple sum to 1.0). For example, applying the sentiment analysis module 122 to the above example results in:

{08:30:14 [Jane N.] Hello, and thank you for calling State Farm Insurance company. My name is Jane. How many I help you today?}=>{0.0, 1.0, 0.0}
{08:30:15 [John M.] I'm calling to request assistance with my car insurance accounts.}=>{0.1, 0.9, 0.0}

In some embodiments, a Boolean sentiment score may be generated instead, representing positive or negative sentiment, and/or the neutral sentiment score may be omitted. The sentiment analysis service 122 analyzes semantic and/or literal sentiment. The sentiment analysis service 122 analyzes words that appear in the transcript for their independent sentiment value (e.g., "wonderful" has a positive denotation, "terrible" has a negative denotation). The sentiment analysis service 122 analyzes tone, inflection, rise and fall of voice, emotional timbre of speech, etc. By analyzing semantic content of speech, the sentiment analysis service 122 is able to determine when a user's literal sentiment does not match the semantic sentiment (e.g., facetiousness, sarcasm, irony, etc.). The sentiment analysis service 122 may use transcript timestamps to retrieve matching portions of the corresponding call audio from the call data database 112, when the semantic context is not clear. By only processing those portions of the call audio that are necessary to resolve semantic ambiguity, the present techniques drastically and dramatically reduce the amount of computational resources (e.g., CPU cycles, memory, network bandwidth, etc.) necessary to perform the sentiment analysis 122. The sentiment analysis service 122 stores the sentiment stores in the scores 126 database.

Intra-Call Sentiment Score Analysis Embodiments

Figure 2:
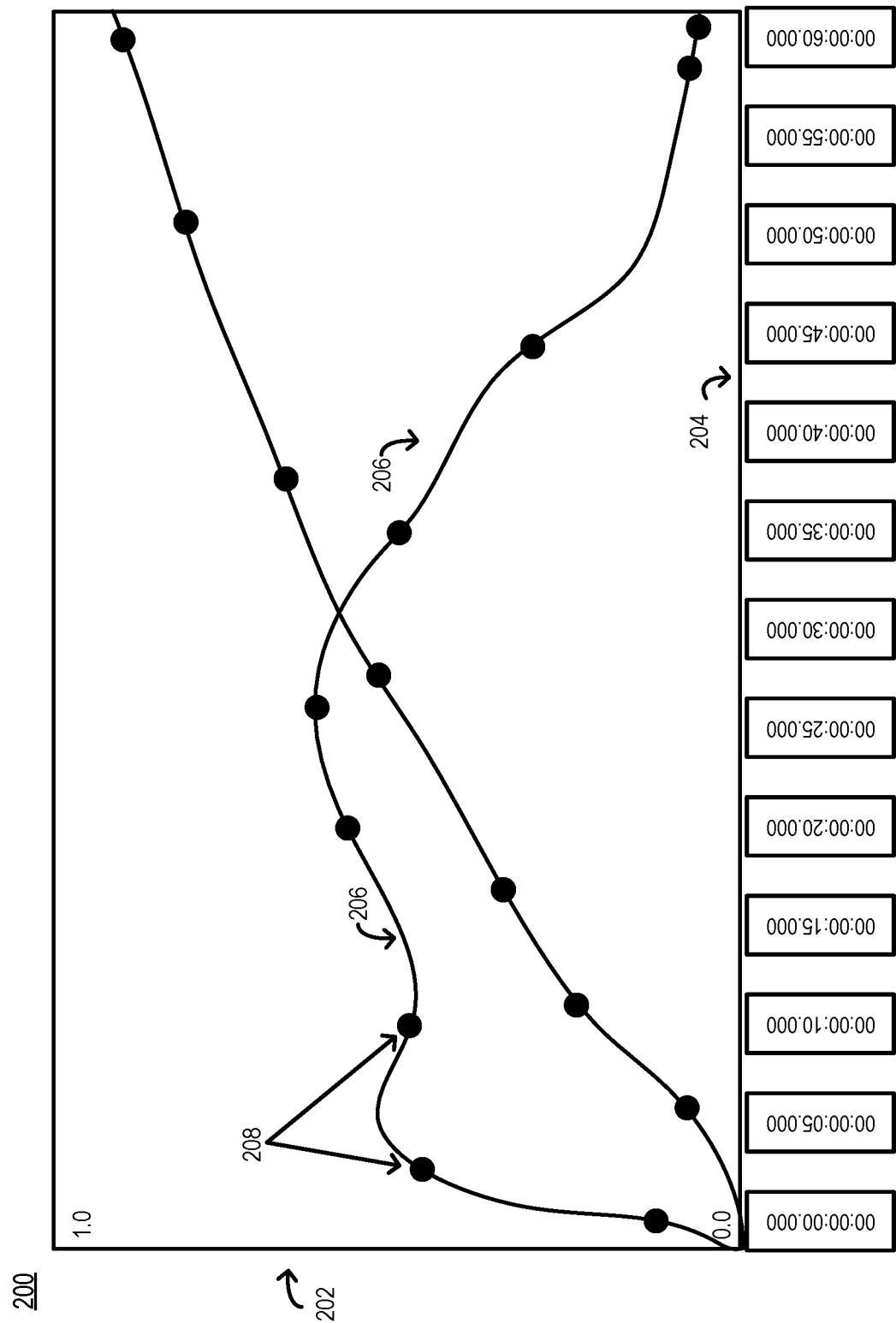
FIG. 2 depicts an example intra-call sentiment score chart, according to an embodiment.

FIG. 2 depicts an example intra-call sentiment score chart 200. The intra-call sentiment score chart 200 includes two axes. The Y axis 202 of the intra-call sentiment score chart 200 depicts the net sentiment score throughout the call. The X axis 204 represents the call time over one minute in five second increments. One or more lines 206 through one or more respective sets of points 208 represent the respective net sentiment of the two callers, and are smoothed for discussion purposes. In some embodiments, no smoothing is performed. The sentiment values may be sampled at any interval. In some embodiments, a minimum interval is the time interval between the respective sets of points 208 (e.g., between statements in a transcript). In some embodiments, inter-statement sentiment values may be inferred (e.g., using a modelling approach). Of course, as above, two or more callers may be included in some cases. By graphing call sentiment over time, an analyst reviewer can obtain a quick grasp of the sentiment of the respective callers. The reviewer can select one or more of the points in the one or more respective sets of points to determine what was said during the call. Selecting one of the points 208 may cause a menu to be displayed that includes the context of the discussion (e.g., the text of the transcript at that point in time, and an individual sentiment score). When the user sees a sentiment inflection point in the graph 200, the user can quickly determine the statement(s) leading up to, and precipitating, the change in sentiment, by selecting those statements.

In an embodiment, sentiment scores are used as a stand-in for a more cumbersome satisfaction survey. Conventionally, an organization seeking to better understand the impressions of its users was required to conduct expensive surveying, which can be biased. The present technique allow the organization to understand user feedback without soliciting survey responses, advantageously saving time and computational resources. Further, by analyzing intra-call sentiment scores, the organization can understand a customer's initial and final sentiment, with all points in between. Such intra-call awareness allows the organization to conclusively determine whether the discussion with the organizational representative resulted in an improvement to the customer's sentiments. The organization can determine, based on the emotional feedback of the caller/customer whether certain topics are associated with negative sentiments, and/or negative changes in sentiment. The changes may be measured on a speaker-by-speaker basis so that, for example, the company can measure a change in the sentiment of the caller and/or a change in the sentiment of the customer service employee call answerer. In some embodiments, sentiment may be computed as a time-weighted average (TWA).

Moreover, the organization can determine whether certain topics are associated with certain customer sentiment. The organization can further determine whether certain employees of the organization improve initial negative sentiment, and route calls appropriately. For example, in a longitudinal measurement of call outcomes, a corporation may determine that certain call center employees more effectively improve customer sentiment when the initial sentiment is strongly negative, and route callers whose sentiment is measured as negative to those employees in real time, or on subsequent contact. The information on call outcomes can also be used to improve call quality overall by improving training of employees. An ML model may be used to predict whether a negative sentiment outcome is due to a certain caller's distress, a topical issue (e.g., a caller reporting a claim including severe injury or loss of life), a call center employee, etc. The employer may use such predictions to mitigate similar calls in the future.

Example Processed Transcript

FIG. 3 depicts an example transcript 300. The transcript 300 may correspond to the transcript generated by the anonymization, redaction and de-identification service 116, as discussed with respect to FIG. 1. The transcript 300 represents a call conversation between an agent and a customer, over several seconds. The transcript 300 includes a first de-identification word 302, wherein the name of the agent has been replaced (e.g., by the anonymization, redaction and de-identification service 116) with a generic word. For example, the anonymization, redaction and de-identification service 116 may have encountered the name of the agent in an agent corpus stored in the corpora 120. The anonymization, redaction and de-identification service 116 may, in some circumstances, process the agent portions of transcripts with certain corpora, and the customer portions of transcripts with other corpora. Such selective processing may be configured by the administrative user. FIG. 3 depicts a redacted word 304. The redacted word may be replaced when the anonymization, redaction and de-identification service 116 encounters a question including the term "maiden name" followed by an answer, in some embodiments. That is, the anonymization, redaction and de-identification service 116 regex pattern may be programmed to look for questions including certain patterns, followed by declarative user responses, wherein the declarative user responses include a proper noun. It should be appreciated that the redacted word 304 mode corresponds to REDACT, not DESCRIBE (i.e., the replaced text is a single non-descriptive character, "X").

The transcript 300 further depicts a redacted compound word 306, corresponding to an Address. The redacted compound word 306 may be redacted on the basis of matching an address regular expression, in some embodiments. A redacted word 308 corresponds to a place name that may correspond to a place names category corresponding to a place names corpus, stored for example in the corpora 120.

A redacted vehicle make and model 310 correspond to a vehicle make and model that are stored as a make and/or model corpora. Redacted words 312, 314 and 316 correspond, respectively, to a family relation, a person name, and an injury description. For example, a family relation may be a brother, cousin, uncle, aunt, daughter, etc. and may be identified by reference to a relation corpus. The person name word 314 may be a first name stored in a name corpus. The description of injury may be identified by reference to a regular expression. For example, the anonymization, redaction and de-identification service 116 may create a regular expression to match surgical and/or medical terms such as "broke a bone."

Example Machine Learning Processing

Figure 4:
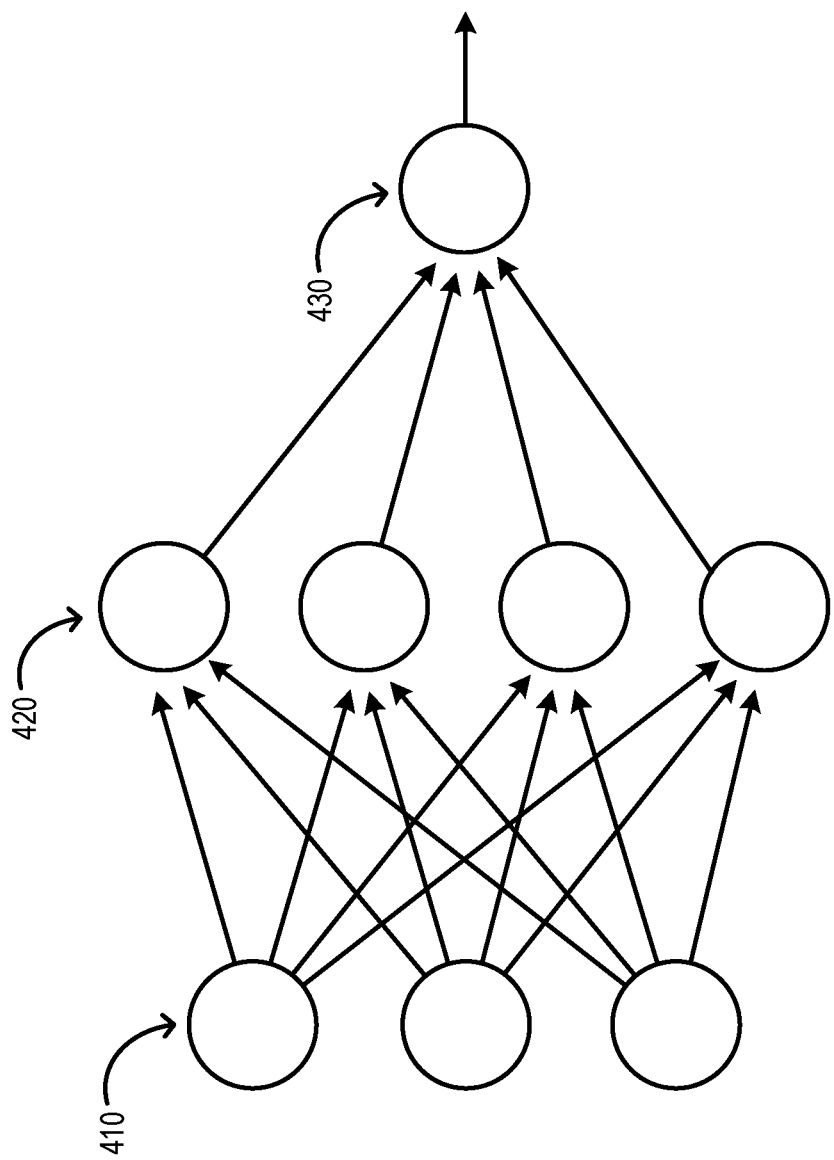
FIG. 4 depicts an example machine learning model, according to one embodiment and scenario.

In some embodiments, anonymization, redaction and/or de-identification may be performed by processing the transcript 300 using a trained ML model. The machine learning service 128 may train models, and may access trained models. FIG. 4 depicts an example ML model 400. The ML model 400 may be trained by the machine learning service 128 executing in the memory of a computing device analyzing a data labeled data set. For example, the labeled data set may include a list of categorical phrases (e.g., medical phrases) such as "broke her arm," "smashed his finger," "slipped and fell." Each phrase may be associated with a label, such as "DescriptionOfInjury."

The machine learning service 128 may include computer-executable instructions for training one or more ML model using the list of categorical phrases. In general, an ML module may train one or more ML models by establishing a network architecture, or topology, and adding layers that may be associated with one or more activation functions (e.g., a rectified linear unit, softmax, etc.), loss functions and/or optimization functions. One or more types of artificial neural networks may be employed, including without limitation, recurrent neural networks, convolutional neural networks, and/or deep learning neural networks. Data sets used to train the artificial neural network(s) may be divided into training, validation, and testing subsets, and these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values. In an embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction. In another embodiment, a Bayesian model may be used to train the ML model.

In an embodiment, the one or more ML models may include an artificial neural network having an input layer 410, one or more hidden layers 420, and an output layer 430. Each of the layers in the artificial neural network may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of artificial neural networks are possible. In an embodiment, the input layer 410 may correspond to input parameters that are given as full sentences, or that are separated according to word or character (e.g., fixed width) limits. The input layer 410 may correspond to a large number of input parameters (e.g., one million inputs), in some embodiments, and may be analyzed serially or in parallel. Further, various neurons and/or neuron connections within the artificial neural network may be initialized with any number of weights and/or other training parameters. Each of the neurons in the hidden layers 420 may analyze one or more of the input parameters from the input layer 410, and/or one or more outputs from a previous one or more of the hidden layers 420, to generate a decision or other output. The output layer 430 may include one or more outputs, each indicating a prediction. In some embodiments and/or scenarios, the output layer 430 includes only a single output.

Once the ML model is trained, a module (e.g., the machine learning service 128) may provide a portion of the transcript to the trained ML model as input, and may receive from the ML model a classification of the provided portion. For example, the classification of the provided portion may be a value representing a probability that the portion corresponds to a description of an injury, a person name, or another piece of personally identifiable information. When the ML model determines that the portion of the transcript corresponds to personally identifiable information, the anonymization, redaction and de-identification service 116 may redact the portion from the transcript. In some cases the ML model may provide a category of redaction to which the portion belongs (e.g., PersonName 314, Relation 312, Address 306, etc.). The ML model may be used instead of, and/or in conjunction with the regular expression database 118 and the corpora database 120, in some embodiments. For example, for the sake of efficiency, the anonymization, redaction and de-identification service 116 may first determine whether a portion of the transcript matches a regular expression in the regular expression database 118 and/or the corpora database 120. When there is no match to one or both of the databases, the anonymization, redaction and de-identification service 116 may call the trained ML model, passing the portion of the transcript as a parameter. In this way, the anonymization, redaction and de-identification service 116 preserves resources by not processing the entire transcript using the trained ML model.

The operator of the present techniques may build a model to analyze each all to determine whether a net sentiment value is positive or negative, and may alter word tracks to elicit responses from callers with respect to certain topics. The word tracks may be alternated in A/B testing to determine which word track improves the customer sentiment, and the word track with the improved customer sentiment may be selected for future use and tested against other candidate word tracks.

In some embodiments, the ML techniques described herein may perform an important function that is not possible to address with either a regular expression or keyword-based approach. Specifically, when two callers decide to communicate personally identifiable information implicitly, by communicating personal info "between the lines," an ML-based approach may detect the personally-identifiable information when the regular expression matching and keyword-based matching may not.

Example Computing Environment

Figure 5:
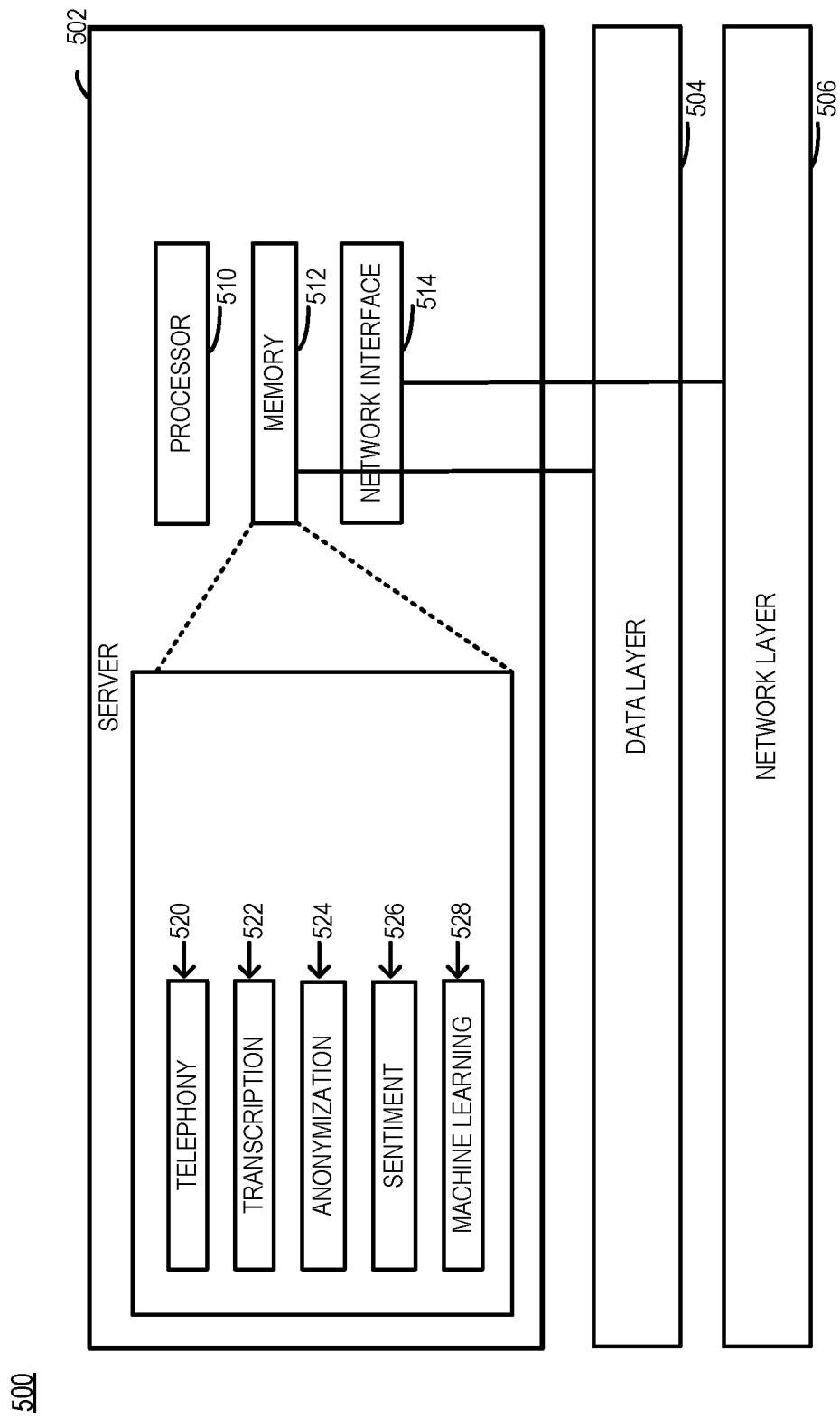
FIG. 5 depicts an exemplary computing environment for implementing the present techniques, according to an embodiment.

FIG. 5 depicts an exemplary computing environment 500 for implementing the present techniques. The environment 500 may include a server 502, a data layer 504, and a network layer 506. The server 502, the data layer 504, and the network layer 506 are communicatively coupled via a computer network. In some embodiments, the server 502 may be remote from other devices communicatively coupled to the server 502 via the network layer 506. The network layer 506 may include any suitable combination of wired and/or wireless communication networks, such as one or more local area networks (LANs), metropolitan area networks (MANs), and/or wide area network (WANs). As just one specific example, the network 506 may include a cellular network, the Internet, and a server-side LAN. As another example, the network 506 may support a cellular (e.g., 4G, 5G, etc.) connection to a mobile computing device of a user and an IEEE 802.11 connection to the mobile computing device. The data layer 504 may comprise any suitable database (e.g., a structured query language (SQL) database, a flat file database, a key/value data store, a relational database management system (RDBMS), etc.), a plurality of database tables for storing data according to data storage schema, relational linkages between tables, and complex data types such as time series data. The server 502 may, in some implementations, include multiple servers and/or other computing devices. Moreover, the server 502 may include multiple servers and/or other computing devices distributed over a large geographic area (e.g., including devices at one or more data centers), and any of the operations, computations, etc., described below may be performed in by remote computing devices in a distributed manner.

The server 502 may include a processor 510, a memory 512, a network interface 514, an input device (not depicted) and a display (not depicted). The processor 510 may be a single processor (e.g., a central processing unit (CPU)), or may include a set of processors (e.g., a CPU and a graphics processing unit (GPU)). The computing environment 500 may include one or more instances of the server device 502. For example, a first user (e.g., an administrator) may use a first server device 502 while a second user (e.g., a machine learning developer) uses a second server device 502 and so on with many (e.g., thousands) of users. The many users may be geographically distributed throughout a large area (e.g., throughout the world). In some cases, a first instance of the server device 502 may be configured as a server or a desktop-configured instance, whereas a second instance is configured as a mobile computing device instance. The one or more instances of the server device 502 may access the data layer 504 and the network layer 506 to simultaneously access digital data and/or other devices.

The memory 512 may be a computer-readable, non-transitory storage unit or device, or collection of units/devices, that includes persistent (e.g., hard disk) and/or non-persistent memory components. The memory 512 may store instructions that are executable on the processor 510 to perform various operations, including the instructions of various software applications and data generated and/or used by such applications. For example, the memory 512 may include one or more memory modules, such as a telephony module 520, a transcription module 522, an anonymization module 524, a sentiment module 526, and a machine learning module 528.

In the example implementation of FIG. 1, the memory 512 stores instructions that when executed by the processor 520 cause the server 502 to perform the various functions provided by the modules 520-528. In some embodiments, the telephony module 520, the transcription module 522, the anonymization module 524, the sentiment module 526, and the machine learning module 528 may correspond, respectively, to the call center call recorder 110, the transcription and speech-to-text service 114, the an anonymization, redaction, and de-identification service 116, the sentiment analysis service 122, and the machine learning service 128. Each of the call data database 112, the regex database 118, the corpora database 120, the models database 124, and the scores database 126 may reside and/or be implemented in the data layer 504. The network firewall 106 may be implemented in the network layer 506.

The network interface 514 includes hardware, firmware and/or software configured to enable the server device 502 to exchange electronic data with other devices via the network layer 506, and to access other networked resources, such as the various databases depicted in FIG. 1. For example, network interface 514 may include a cellular communication transceiver, a Wifi transceiver, and/or transceivers for one or more other wireless communication technologies (e.g., 4G). The input device includes hardware, firmware and/or software configured to enable a user to interact with (i.e., both provide inputs to) the server device 502. For example, the input device may be a computer keyboard, a mouse, a tablet pen, etc. More than one input device may be attached to the server device 502. The display includes hardware, firmware and/or software configured to enable a user to interact with (i.e., perceive outputs of) the server device 502. For example, the display may be a computer monitor. In some embodiments, the input device and the display may be combined. For example, the display may include a capacitive touchscreen with both display and manual input capabilities. Alternatively, or in addition, the display may include a keyboard for accepting user inputs, and/or a microphone (with associated processing components) that provides voice control/input capabilities to the user.

The modules 520-528 include respective sets of computer executable instructions executing in the memory 512 of the server device 502 that allow a user (e.g., an administrative user or a non-administrative user) to access the server 502. In various embodiments, the modules 520-528 may be implemented as desktop/server applications, web applications, mobile computing device applications, etc.

Exemplary Methods

Figure 6:
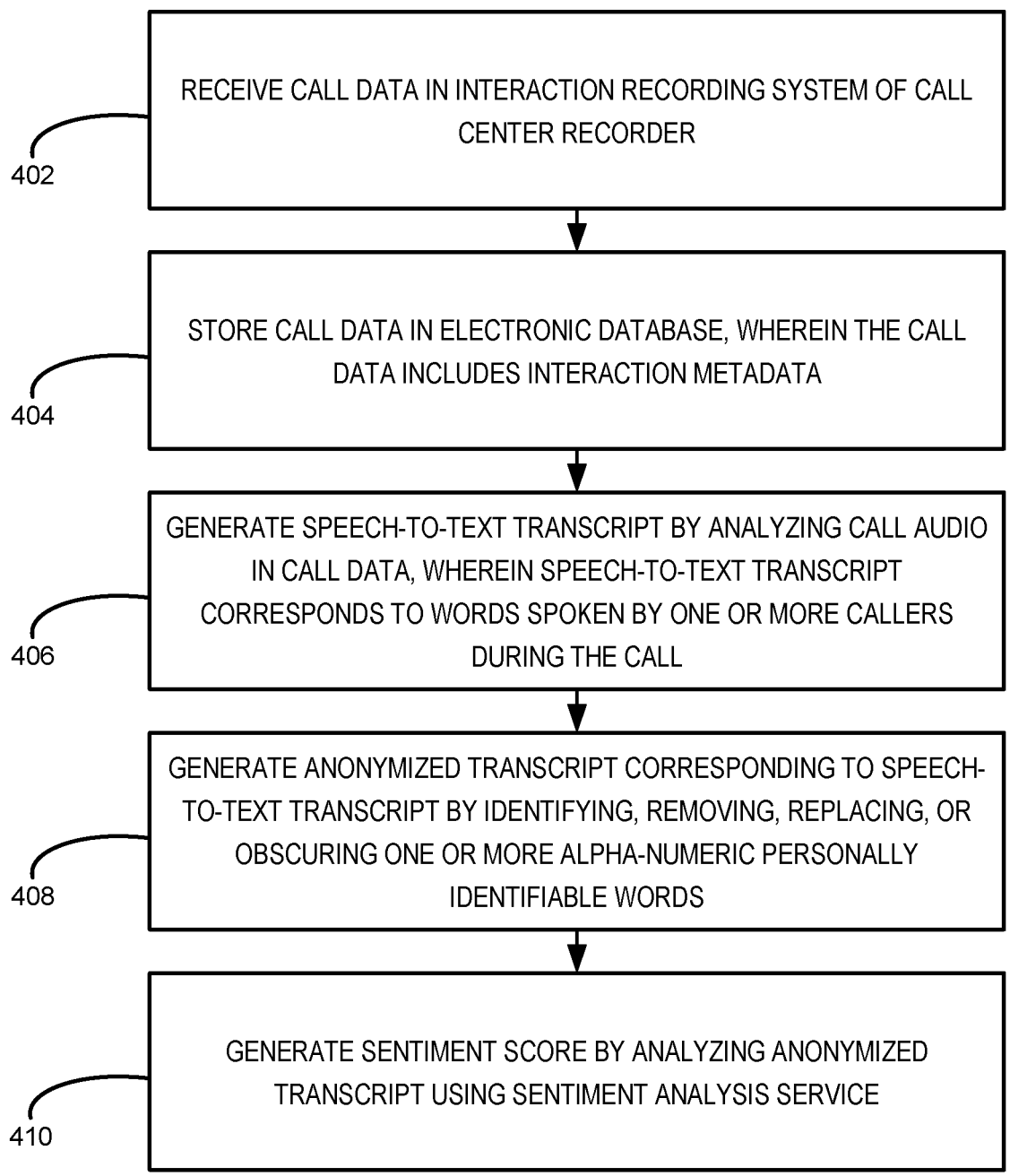
FIG. 6 depicts an exemplary computer implemented method for confidential sentiment analysis, according to one embodiment and scenario.

FIG. 6 depicts an exemplary method 600 for implementing confidential sentiment analysis, according to an embodiment and scenario.

The method 600 includes receiving call data in an interaction recording system of a call center recorder, wherein the interaction recording system is located behind a firewall of an internal network sub-environment (block 602). For example, the call data may be received from the user 108 via the firewall 106, by the call center call recorder service 106. The method 600 includes storing the call data in an electronic database, wherein the call data includes interaction metadata (block 604). The call data may be stored in the call data database 112 in any suitable audio format. The telephony module 520 of the server 502 may include a set of computer executable instructions that cause the receiving of call data and storage to occur. Further, the telephony module 520 may include instructions for collecting user consent to record, monitor, and/or store the call data. The call data may include metadata as discussed above.

The method 600 includes generating a speech-to-text transcript by analyzing call audio in the call data, wherein the speech-to-text transcript corresponds to words spoken by one or more callers during the call (block 606). The speech-to-text transcript may correspond to the transcript 300 of FIG. 3, and may be generated by the transcription and speech-to-text service 114 of FIG. 1, for example. The words included in the transcript may correspond to words spoken by the one or more callers and stored in the call data database 112. The transcription module 522 of FIG. 5 may generate the speech-to-text transcript, in some embodiments and scenarios.

The method 600 includes generating an anonymized transcript corresponding to the speech-to-text transcript by identifying, removing, replacing, or obscuring one or more alpha-numeric personally identifiable words (block 608). For example, the anonymized transcript may correspond to the transcript 300 of FIG. 3, after anonymization has occurred (i.e., as depicted). The anonymization, redaction and de-identification service 116 of FIG. 1 may generate the anonymized transcript by creating a copy of the speech-to-text transcript, or by editing the speech-to-text transcript in place. The anonymization, redaction and de-identification service 116 may correspond to the anonymization module 524 of FIG. 5. The anonymization, redaction and de-identification service 116 may communicate via the data layer 504 with the regex database 118 and/or the corpora database 120, to receive/retrieve (respectively) regular expressions and a word corpora. The anonymization, redaction and de-identification service 116 may apply the keywords and/or regular expressions to the speech-to-text transcript to generate the anonymized transcript. In some embodiments, the anonymization, redaction and de-identification service 116 may apply the transcript to the machine learning service 128 to generate the anonymized transcript. It should be appreciated that in some embodiments, any of regular expressions, keyword corpora, and/or machine learning methods (e.g., the machine learning model 400 of FIG. 4) may be used to generate the anonymized transcript. For example, the ML model 400 may be trained so that every word in the speech-to-text transcript is inputted into the ML model 400, and the ML model 400 outputs a redacted word when the inputted word corresponds to personally-identifiable information, whereas the ML model 400 outputs the inputted word when the inputted word does not correspond to personally-identifiable information. Such an ML model could be trained by the machine learning module 528 of FIG. 5, for example, using a dataset of labeled personally-identifiable information stored in the models database 124.

The method 600 includes generating a sentiment score by analyzing the anonymized transcript using a sentiment analysis service (block 610). For example, as depicted in FIG. 2, an intra-call sentiment score chart 200 may be computed and graphed, in some embodiments. The intra-call sentiment score chart depicts respective sentiment score values of multiple callers at different time intervals, allowing an interested party to quickly determine changes in sentiment over time. The user can interact with the chart 200 to zero in on notable sentiment inflection points. Sentiment scores are generated by the sentiment module 526 of FIG. 5, in some embodiments.

It should be appreciated that the present techniques are applicable in a wide variety of applications, beyond the health care and insurance context. For example, an online retailer may seek to use the present techniques to anonymize customer order data. A university may seek to use the present techniques to anonymize student records. A government actor may seek to anonymize information for research or security purposes. Many useful applications are envisioned, and the examples provided herein are not intended to be limiting of such applications.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, the term "set" may include a collection of one or more elements.

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer implemented method for confidential sentiment analysis, comprising:
    receiving call data of a call in an interaction recording system of a call center recorder, wherein the interaction recording system is located behind a firewall of an internal network sub-environment,
    within the internal network sub-environment:
        (i) storing the call data in an electronic database, wherein the call data includes interaction metadata,
        (ii) generating a speech-to-text transcript by analyzing call audio in the call data, wherein the speech-to-text transcript corresponds to words spoken by one or more callers during the call,
        (iii) generating an anonymized transcript corresponding to the speech-to-text transcript by identifying, removing, replacing, or obscuring one or more alpha-numeric personally identifiable information, and
        (iv) generating a sentiment score by analyzing the anonymized transcript using a sentiment analysis service.

2. The method of claim 1, wherein the interaction recording system is located behind the firewall of the internal network sub-environment includes collecting a consent of the caller to store the call data.

3. The method of claim 1, wherein storing the call data includes storing caller identification information.

4. The method of claim 1, wherein generating the anonymized transcript by identifying, removing, replacing, or obscuring one or more alpha-numeric personally identifiable information is based on matching regular expression patterns against the speech-to-text transcript.

5. The method of claim 1, wherein generating the anonymized transcript by identifying, removing, replacing, or obscuring one or more alpha-numeric personally identifiable information is based on matching keywords in the speech-to-text transcript to one or more corpora of words.

6. The method of claim 1, wherein generating the anonymized transcript by identifying, removing, replacing, or obscuring one or more alpha-numeric personally identifiable information is based on analyzing the speech-to-text transcript using a trained machine learning model.

7. The method of claim 1, wherein generating the sentiment score by analyzing the anonymized transcript using the sentiment analysis service includes generating a time series wherein each time step corresponds to a time in the anonymized transcript, and each time step is associated with a sentiment score, wherein the sentiment score indicates the sentiment at the respective time step.

8. The method of claim 1, wherein generating the sentiment score by analyzing the anonymized transcript using the sentiment analysis service includes generating an intra-call sentiment score.

9. A confidential sentiment analysis computing system, comprising
   one or more processors, and
   a memory including computer executable instructions that, when executed by the one or more processors, cause the computing system to:
   receive call data of a call in an interaction recording system of a call center recorder, wherein the interaction recording system is located behind a firewall of an internal network sub-environment,
   within the internal network sub-environment:
      (i) store the call data in an electronic database, wherein the call data includes interaction metadata,
      (ii) generate a speech-to-text transcript by analyzing call audio in the call data, wherein the speech-to-text transcript corresponds to words spoken by one or more callers during the call,
      (iii) generate an anonymized transcript corresponding to the speech-to-text transcript by identifying, removing, replacing, or obscuring one or more alpha-numeric personally identifiable information, and
      (iv) generate a sentiment score by analyzing the anonymized transcript using a sentiment analysis service.

10. The computing system of claim 9, the memory containing further instructions that, when executed by the one or more processors, cause the computing system to:
    collect a consent of the caller to store the call data.

11. The computing system of claim 9, the memory containing further instructions that, when executed by the one or more processors, cause the computing system to:
    generate the anonymized transcript by matching regular expression patterns against the speech-to-text transcript.

12. The computing system of claim 9, the memory containing further instructions that, when executed by the one or more processors, cause the computing system to:
    generate the anonymized transcript by matching keywords in the speech-to-text transcript to one or more corpora of words.

13. The computing system of claim 9, the memory containing further instructions that, when executed by the one or more processors, cause the computing system to:
    generate the anonymized transcript by analyzing the speech-to-text transcript using a trained machine learning model.

14. The computing system of claim 9, the memory containing further instructions that, when executed by the one or more processors, cause the computing system to:
    generate a time series wherein each time step corresponds to a time in the anonymized transcript, and each time step is associated with a sentiment score, wherein the sentiment score indicates the sentiment at the respective time step.

15. The computing system of claim 9, the memory containing further instructions that, when executed by the one or more processors, cause the computing system to:
    generating an intra-call sentiment score.

16. A non-transitory computer readable medium containing program instructions that when executed, cause a computer system to:
    receive call data of a call in an interaction recording system of a call center recorder, wherein the interaction recording system is located behind a firewall of an internal network sub-environment,
    within the internal network sub-environment:
       (i) store the call data in an electronic database, wherein the call data includes interaction metadata,
       (ii) generate a speech-to-text transcript by analyzing call audio in the call data, wherein the speech-to-text transcript corresponds to words spoken by one or more callers during the call,
       (iii) generate an anonymized transcript corresponding to the speech-to-text transcript by identifying, removing, replacing, or obscuring one or more alpha-numeric personally identifiable information, and
       (iv) generate a sentiment score by analyzing the anonymized transcript using a sentiment analysis service.

17. The non-transitory computer readable medium of claim 16, including further program instructions that when executed, cause a computer system to:
    collect a consent of the caller to store the call data.

18. The non-transitory computer readable medium of claim 16,
    including further program instructions that when executed, cause a computer system to:
    generate the anonymized transcript by matching regular expression patterns against the speech-to-text transcript.

19. The non-transitory computer readable medium of claim 16, including further program instructions that when executed, cause a computer system to:
    generate the anonymized transcript by matching keywords in the speech-to-text transcript to one or more corpora of words.

20. The non-transitory computer readable medium of claim 16, including further program instructions that when executed, cause a computer system to:
    generate the anonymized transcript by analyzing the speech-to-text transcript using a trained machine learning model.

* * * * *